United States Patent [19]

Tschang et al.

[11] Patent Number: 4,658,002

[45] Date of Patent: * Apr. 14, 1987

[54] PREPARATION OF INSOLUBLE POLYMER POWDERS WHICH ARE ONLY SLIGHTLY SWELLABLE

[75] Inventors: Chung-Ji Tschang, Bad Durkheim; Karlheinz Messmer, Weisenheim; Walter Denzinger, Speyer, all of Fed. Rep. of Germany

[73] Assignee: Basf Aktiengesellschaft, Ludwigshafen, Fed. Rep. of Germany

[*] Notice: The portion of the term of this patent subsequent to Mar. 3, 2004 has been disclaimed.

[21] Appl. No.: 777,329

[22] Filed: Sep. 18, 1985

[30] Foreign Application Priority Data

Sep. 18, 1984 [DE] Fed. Rep. of Germany ....... 3434138

[51] Int. Cl.$^4$ .................................................. C08F 2/34
[52] U.S. Cl. ...................................... 526/264; 526/88; 526/307.1; 526/318.43; 526/323.2
[58] Field of Search .................. 526/88, 201, 203, 264, 526/323.1, 323.2, 318.43, 306, 307.1; 521/38

[56] References Cited

U.S. PATENT DOCUMENTS

| | | |
|---|---|---|
| 3,277,066 | 10/1966 | Grosser et al. . |
| 3,689,439 | 9/1972 | Field ................................... 526/264 |
| 3,933,766 | 1/1976 | Hofmann et al. . |
| 4,013,825 | 3/1977 | Denzinger et al. . |
| 4,059,552 | 11/1977 | Zweigle .............................. 526/306 |
| 4,135,043 | 1/1979 | Kast et al. . |
| 4,361,689 | 11/1982 | Patel ................................... 526/264 |
| 4,451,582 | 5/1984 | Denzinger et al. . |

FOREIGN PATENT DOCUMENTS 0027936 10/1983 European Pat. Off. .

*Primary Examiner*—Paul R. Michl
*Attorney, Agent, or Firm*—Oblon, Fisher, Spivak, McClelland & Maier

[57] ABSTRACT

Insoluble polymer powders which are only slightly swellable are prepared by polymerization of N-vinylpyrrolidone or a mixture of (a) an N-vinylcarboxamide, acrylamide, methacrylamide, acrylic acid, methacrylic acid, acrylates, methacrylates and/or a vinyl ester and (b) from 0.1 to 10% by weight, based on the total amount of monomers, of, as a crosslinking agent, a compound possessing two or more ethylenically unsaturated double bonds, in a powder bed in the presence of a heat-transfer medium and in the absence of oxygen and polymerization initiators, at from 90° to 220° C., the powder state being maintained, the reaction mass being circulated and the heat-transfer medium evaporated from the polymerization zone.

The resulting polymers are used as adsorbents, as formulation assistants for crop protection agents or as ion exchangers.

14 Claims, No Drawings

PREPARATION OF INSOLUBLE POLYMER POWDERS WHICH ARE ONLY SLIGHTLY SWELLABLE

German Pat. No. 2,255,263 discloses a process for the preparation of insoluble crosslinked N-vinylpyrrolidone polymers which are only slightly swellable, in which N-vinylpyrrolidone is polymerized in aqueous solution in the presence of, as a crosslinking agent, from 0.5 to 10% by weight, based on the N-vinylpyrrolidone, of a cyclic acid amide which contains two or more ethylenically unsaturated groups, not less than one of which is bonded to the amide nitrogen. The polymerization reaction is initiated by heating the reaction solution to not less than 80° C., and is completed at the boiling point of water.

U.S. Pat. No. 3,277,066 relates to a process for the preparation of insoluble polymers of N-vinyllactams by heating N-vinyllactams in the presence of oxides and hydroxides of alkali metals or alkaline earth metals as catalysts, and of water. The polymerization is initiated at elevated temperatures, e.g. 140° C., and then continued at a lower temperature (100° C.).

According to German Pat. No. 2,437,640, N-vinylpyrrolidone is polymerized in dilute aqueous solution in the presence of the same crosslinking agent, in the absence of oxygen and additionally in the presence of from 0.05 to 2% by weight, based on N-vinylpyrrolidone, of one or more α- or β-ketocarboxylic acids or their methyl or ethyl esters. In the conventional process, it is necessary for at least a small amount of a base to be used concomitantly. However, care must be taken to ensure that polymerization is not effected at too high a pH, since otherwise yellowing of the polymers occurs.

U.S. Pat. No. 4,451,582 discloses a process for the preparation of insoluble, particulate polymers which are only slightly swellable in water and are obtained from basic vinyl heterocycles having a pKa higher than 4, and their copolymers with as much as 30% by weight of copolymerizable monomers, wherein the monomers are polymerized in the presence of from 0.1 to 10% by weight, based on the total amount of monomers, of a crosslinking agent, in the absence of oxygen and polymerization initiators. The polymers are preferably prepared by precipitation polymerization in water. However, they may also be obtained in the absence of solvents for the monomers, by heating the latter to, preferably, 150°–180° C. The reaction is of course difficult to control and gives only low space-time yields and relatively highly contaminated products.

It has also been disclosed that insoluble polymers of acrylic acid which are only slightly swellable, i.e. popcorn polymers, can be prepared by polymerizing acrylic acid in aqueous solution in the presence of a small amount of 2,2'-azobisisobutyronitrile (cf. J. W. Breitenbach et al., Makromol. Chemie 177 (1976), 2787-2792). However, this procedure gives polymer mixtures which contain a glassy polymer (gel) as principal component and the popcorn polymer of acrylic acid in minor amounts. The polymer mixtures cannot be separated at an acceptable cost in industry.

German Laid-Open Application DOS No. 2,636,243 relates to a process for the preparation of polymer powders, wherein water-soluble ethylenically unsaturated compounds which form hydrophilic polymers are polymerized in the presence of water as a heat-transfer medium in a powder bed to give water-soluble or water-swellable polymers, the powder state being maintained, the reaction mass being circulated and the water from the polymerization zone being evaporated.

European Patent Application No. 27,936 discloses a process for the preparation of polymer powders from polymerizable monoethylenically unsaturated compounds, wherein the monomers are polymerized in a powder bed in the presence of a conventional polymerization initiator, the powder state being maintained and the reaction mass being circulated. The heat of polymerization is removed using as a heat-transfer medium an organic solvent which constitutes a precipitating agent for the polymers. The organic solvents are removed from the polymerization zone in the form of vapor. Water-soluble or water-swellable polymers are obtained.

It is an object of the present invention to provide a process for the preparation of insoluble polymer powders which are only slightly swellable and are based on monoethylenically unsaturated carboxamides, carboxylic acids and carboxylates, in which a very pure polymer powder is obtained directly, and the space-time yield is higher than in the conventional processes for the preparation of insoluble polymers.

We have found that this object is achieved, in accordance with the invention, if N-vinylpyrrolidone or a mixture of p0 (a) a compound of the formula

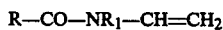

$$R\text{---}CO\text{---}NR_1\text{---}CH=CH_2$$

where R is H or $C_1$–$C_3$-alkyl and $R_1$ is H or $CH_3$, acrylamide, methacrylamide, acrylic acid, methacrylic acid, acrylates, methacrylates and/or a vinyl ester and (b) from 0.1 to 10% by weight, based on the total amount of monomers, of, as a crosslinking agent, a compound which possesses two or more ethylenically unsaturated double bonds are polymerized in the absence of oxygen and a polymerization initiator in a powder bed which contains or consists of an insoluble polymer which is only slightly swellable, in the presence of a heat-transfer medium which is inert to the reactants, at from 90° to 220° C., the powder state being maintained, the reaction mass being circulated and the heat-transfer medium being evaporated from the polymerization zone.

In contrast to the conventional preparation of insoluble polymer powders which are only slightly swellable, i.e. the popcorn polymers, the preparation of these polymers takes place according to the present invention in a powder bed, the powder state of the reaction mixture being maintained for the entire polymerization. The induction period usually observed in polymerization processes can be avoided in the novel process, if any insoluble polymer which is only slightly swellable (popcorn polymer) is initially taken in the polymerization zone, this polymer having been prepared, and where relevant stored and handled, in the absence of oxygen. Such popcorn polymers possess a sufficient number of active centers to initiate polymerization of the monomers when suitable monomer mixtures are fed in. Popcorn polymers which have come into contact with oxygen can also be used for initiating the popcorn polymerization after the oxygen has been completely removed. This is done, for example, by treating a popcorn polymer in an inert gas stream, e.g. in a stream of nitrogen, if necessary at elevated temperatures.

Suitable monomers for the preparation of the insoluble polymers which are only slightly swellable are compounds of the formula

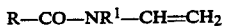

where R is H or $C_1$–$C_3$-alkyl and $R^1$ is H or $CH_3$.

Typical examples of this class of compounds are N-vinylformamide (H—CO—NH—CH=$CH_2$), N-vinyl-N-methylformamide and N-vinyl-N-methylacetamide.

Among these compounds, N-vinylformamide (H—CO—NH—CH=$CH_2$) occupies a special position since it can also be polymerized in the absence of monomers of group (b) to give insoluble polymers which are only slightly swellable. However, such polymers can of course also be prepared from N-vinylformamide and the monomers (b). Other suitable monomers of group (a) which can be polymerized with the monomers (b) to prepare popcorn polymers are acrylamide, methacrylamide, acrylic acid, methacrylic acid, acrylates, methacrylates and/or vinyl esters. The acrylates and methacrylates are preferably derived from saturated monohydric alcohols of 1 to 4 carbon atoms or saturated dihydric alcohols of 2 to 4 carbon atoms. Specific examples of these esters are methyl acrylate, methyl methacrylate, ethyl acrylate, ethyl methacrylate, N-propyl acrylate, N-propyl methacrylate, isopropyl acrylate, isopropyl methacrylate and the esters of acrylic acid and methacrylic acid which are derived from the isomeric butanols, and hydroxyethyl acrylate, hydroxyethyl methacrylate, hydroxypropyl acrylate, hydroxypropyl methacrylate, hydroxybutyl acrylate and hydroxybutyl methacrylate. Particularly suitable vinyl esters are vinyl acetate and vinyl propionate.

N-Vinyl formamide, N-vinyl-N-methylformamide, N-vinyl-N-methylacetamide, acrylamide, methacrylamide, acrylic acid and methacrylic acid are particularly useful for the preparation of the popcorn polymers. The compounds of group (a) can be used either alone or as a mixture with one another for the polymerization with the monomers of group (b) in a powder bed. Examples of suitable mixtures are mixtures of N-vinylformamide and acrylic acid,
N-vinylformamide and methacrylic acid,
N-vinylformamide and acrylamide,
N-vinylformamide and methacrylamide,
N-vinylformamide and an acrylate or methacrylate of a $C_1$–$C_4$-alcohol,
acrylamide and acrylic acid,
acrylamide and methacrylic acid,
methacrylic acid and acrylic acid and
acrylamide and methacrylamide.

It is of course also possible to subject more than two of the stated monomers of group (a) to the polymerization in the powder bed, for example mixtures of acrylamide, acrylic acid and methacrylic acid, and of acrylamide, methacrylic acid and a hydroxyalkyl methacrylate or acrylate. The monomers of group (a) can be mixed with one another in any ratio. Preferably, the monomer mixtures of component (a) which are polymerized consist of from 20 to 100% by weight of acrylamide and/or methacrylamide together with from 80 to 0% by weight of acrylic acid and/or methacrylic acid. The insoluble polymers which are only slightly swellable contain from 99.9 to 90% by weight of the compounds of group (a).

The crosslinking agent used as the monomer of component (b) is a compound which possesses two or more ethylenically unsaturated double bonds which are not conjugated. Preferred crosslinking agents are divinylethyleneurea, ethylidene-bis-3-(N-vinylpyrrolidone), 1-vinyl-3-ethylidenepyrrolidone, allyl acrylate, allyl methacrylate, divinylpropyleneurea, butanediol diacrylate, methylene-N,N'-bisacrylamide and ethylene-N,N'-bisacrylamide. Instead of methylene-N,N'-bisacrylamide, it is also possible to start from acrylamide and formaldehyde, since the bifunctional crosslinking agent is in any case formed under the polymerization conditions. It is of course also possible to use a mixture of methacrylamide and formaldehyde as the crosslinking agent. The crosslinking agents are present in an amount of from 0.1 to 10, preferably from 0.4 to 2, % by weight, based on the total amount of monomers used in the polymerization. It is possible to use either a single crosslinking agent, e.g. divinylethyleneurea or allyl acrylate, or a mixture of a plurality of crosslinking agents, e.g. a mixture of divinylethyleneurea and butanediol diacrylate or of divinylpropyleneurea and methylene-N,N'-bisacrylamide.

The popcorn polymers which are initially taken to initiate the popcorn polymerization can be prepared by the conventional processes, some of which, as prior art processes, are described above. Preferably, known popcorn polymers of N-vinylpyrrolidone and a crosslinking agent are used as the starting material for initiating the polymerization in the novel process. The preparation of the starting material can be carried out in a separate apparatus or in the apparatus in which the polymerization is subsequently carried out in the powder bed. A polymerizable popcorn polymer which initiates the polymerization on addition of a suitable monomer mixture can be prepared starting from, for example, a mixture of from 99.6 to 98.8% by weight of N-vinylpyrrolid-2-one and, as a crosslinking agent, from 0.4 to 1.2% by weight of a compound possessing two or more ethylenically unsaturated double bonds. Freshly distilled N-vinylpyrrolid-2-one is preferably used for this purpose, since N-vinylpyrrolidone which has been stored for a fairly long time gives rise to longer induction periods. The polymerization can be initiated and continued with either water-containing or anhydrous N-vinylpyrrolidone. However, it is advantageous to use anhydrous N-vinylpyrrolidone to initiate the polymerization, since the latter is as a rule initiated at above the boiling point of water. In general, such popcorn polymers are prepared at from 100° to 150° C. in the absence of oxygen and polymerization initiators.

Preferably used crosslinking agents for the preparation of an active popcorn polymer are divinylethyleneurea, ethylidene-bis-3-(N-vinylpyrrolidone), 1-vinyl-3-ethylidenepyrrolidone, butanediol diacrylate, methylene-N,N'-bisacrylamide, ethylene-N,N'-bisacrylamide and/or divinylpropyleneurea. In the preferred embodiment, the amount of crosslinking agent used for the preparation of the active popcorn is less than that used hitherto for the preparation of popcorn polymers of N-vinylpyrrolidone. However, it is also possible to use larger amounts of crosslinking agent for the said preparation, although in this case a longer induction period and polymerization period must be expected. The induction period in the preparation of the active popcorn polymer is about 10–30 minutes. The monomer mixtures described above are polymerized while stirring. When the polymerization is complete, a dry powder forms from the solution and may be stored in the absence of oxygen or used directly as the initially taken material in the polymerization in the powder bed.

It is also possible to use inert, powdered materials as the starting material for the polymerization in the powder bed. Examples of such substances are sand, glass beads, titanium dioxide and polymer powders whose melting point or softening range is above the polymerization temperature. An example of a suitable polymer powder is a bead polymer of styrene which is crosslinked with divinylbenzene or with another compound containing two ethylenically unsaturated double bonds. Polymerization in the powder bed can be initiated by a procedure in which either a preprepared active popcorn polymer is added to this inert powdered material, or a mixture of from 99.6 to 98.8% by weight of N-vinylpyrrolidone and from 0.4 to 1.2% by weight of a compound possessing two or more ethylenically unsaturated double bonds is heated, initially with thorough mixing with the inert powdered material, to 100°–150° C. in the absence of oxygen and polymerization initiators. This procedure gives a polymerizable popcorn polymer which initiates the polymerization of the monomers without an induction period when suitable monomer mixtures are added.

The polymerization in the powder bed may also be initiated starting from an insoluble polymer powder which is only slightly swellable and which is obtained, for example, by heating N-vinylformamide or a monomer mixture of acrylamide and N-vinylpyrrolidone, containing from 0.4 to 2% by weight of a compound possessing two or more ethylenically unsaturated double bonds, in the presence of an inert powdered material, to 100°–150° C. These popcorn polymers may be prepared in the presence or absence of an inert powdered material.

For the novel preparation of popcorn polymers, an insoluble polymer which is only slightly swellable is initially taken in a polymerization zone or is prepared in this zone, and the monomer mixtures of (a) and (b) described above are then polymerized in the presence of a heat-transfer medium which is inert to the reactant and in the absence of oxygen and polymerization initiators, at from 90° to 220° C., the powder state being maintained, the reaction mass circulated and the heat-transfer medium evaporated from the polymerization zone. The purpose of the heat-transfer media is to remove from the reaction system the heat formed during the polymerization and as a result of circulating the powder.

Examples of suitable heat-transfer media are the following substances which are liquid at room temperature: water, alcohols, ketones, ethers, aromatic and aliphatic hydrocarbons, halohydrocarbons and esters. The heat-transfer medium is advantageously used in an amount sufficient to remove from the polymerization zone the heat formed under the reaction conditions. The amount of heat-transfer medium therefore dependent on the heat of evaporation of the particular heat-transfer medium used, i.e. the amount of heat liberated during the polymerization must be about as large as the enthalpy of evaporation of the heat-transfer medium. For example, where water is used as the heat-transfer medium, it is required in an amount of about 5–25%, based on the monomers used in the polymerization, whereas where organic solvents are used an heat-transfer media, about 15–70%, based on the monomers, of solvent is required. Solid monomers, e.g. acrylamide, must be brought into solution before the novel polymerization is carried out. In this respect, it may be necessary to use a larger amount of solvent, e.g. water, than can be evaporated by means of the enthalpy of polymerization. In these cases, it is appropriate to evaporate the excess solvent by supplying heat to the polymerization space. Specific examples of heat-transfer media are methanol, ethanol, isopropanol, n-propanol, n-butanol, isobutanol, tert.-butanol, cyclohexanol, acetone, methyl ethyl ketone, diethyl ketone, cyclohexanone, methyl tert.butyl ether, pentane, hexane, cyclohexane, aliphatic $C_7$–$C_{10}$-hydrocarbons, toluene, xylene, propyl acetate and butyl acetate.

Preferably used heat-transfer media are water, monohydric $C_1$–$C_4$-alcohols, methyl ethyl ketone, cyclohexanone, n-propanol, isopropanol and propyl acetate. The heat-transfer media are liquid at 20° C. and under atmospheric pressure, and have a boiling point of about 40°–150° C.

The heat-transfer medium, together with the monomer mixture, is brought into contact with the powdered polymer, which has been heated to the polymerization temperature. The monomers (a) and (b) are introduced continuously or batchwise into the powder bed, preferably at the rate at which they undergo polymerization. Particularly preferably, the monomers are introduced continuously or batchwise into the powder bed, and the resulting polymer is discharged continuously or batchwise from the polymerization zone in an amount roughly corresponding to the weight of monomers fed in.

The polymerization of the monomers (a) and (b) is carried out in, for example, kettles equipped with mixing elements, autoclaves, which may be arranged as a multistage cascade, or combinations of kettles with downstream flow tubes. A solution of the monomers (a) and (b), preferably in the particular heat-transfer medium used, is sprayed onto the powder bed and onto the powdered material initially taken in the polymerization apparatus, under polymerization conditions. However, the heat-transfer medium may also be introduced into the polymerization zone separately from the monomers. During the polymerization, thorough mixing of the powder bed is ensured. Since the heat-transfer medium is removed from the polymerization zone, the powder state of the reaction mass is maintained during the entire course of the polymerization. If only small amounts of a popcorn polymer are desired, the reaction is terminated as soon as the desired amount has been prepared, or when the polymerization apparatus is filled with polymer. However, the polymerization may also be carried out continuously over several days or even weeks if monomers are introduced continuously or batchwise in each case at the rate at which polymer is discharged from the polymerization zone. Insoluble polymer powders which are only slightly swellable are obtained directly. The composition of the monomers can be changed continuously or abruptly during the polymerization in the fixed bed without stopping the polymerization. For example, N-vinylformamide can be used as component (a) and may be replaced with a mixture of 80% by weight of acrylamide and 20% by weight of acrylic acid, or the polymerization in the fixed bed is begun using methacrylic acid as monomer (a) and a changeover to acrylamide is effected suddenly or gradually in the course of the polymerization. When a steady state has been reached in the reactor, a polymer is obtained whose composition corresponds to that of the monomer mixture.

The popcorn polymers described above are insoluble in all solvents and furthermore only slightly swellable in them. Although they can absorb as much as 10 times their weight of water, they nevertheless differ from polymers regarded as swellable in that their water-absorption capacity is only a fraction of the water-absorption capacity of the conventional gel-like polymers prepared in the presence of a polymerization initiator. The particle diameter of the insoluble polymers which are only slightly swellable is from 0.05 to 8, preferably from 0.3 to 4' mm. The popcorn polymers pre-pared according to the invention are used as adsorbents, for example for adsorbing tannin from beverages, as formulation assistants for crop protection agents and as ion exchangers. Polymers which are particularly suitable as ion exchangers are those which contain carboxyl-containing monomers as copolymerized units, e.g. popcorn polymers prepared using, as component (a), acrylic acid or methacrylic acid alone or as a mixture with other constituents, such as acrylamide or methacrylamide. Popcorn polymers which from the outset do not contain any carboxyl groups can be converted to polymers which permit ion exchange, by hydrolyzing functional groups, e.g. ester or amide groups.

EXAMPLES

In all examples, the polymerization apparatus used was a 1 l flask provided with a magnetic stirrer, an anchor stirrer, a dropping funnel suitable for working under a nitrogen atmosphere, a reflux condenser and a nitrogen feed tube. The flask was immersed in a heatable oil bath, and about 10 l/hour of nitrogen were passed through the apparatus during the polymerization. As soon as an active popcorn polymer was present in the flask, the reflux condenser was replaced by a distillation condenser with a receiver, so that the heat-transfer medium used during the fixed-bed polymerization could be distilled off from the polymerization zone during the polymerization.

EXAMPLE 1

5 g of a macroporous polymer powder consisting of 50% by weight of styrene and 50% by weight of divinylbenzene and having a pore volume of about 1.5 cm$^3$/g and a particle size of from 315 to 500 μm were initially taken in the apparatus described above and were then heated at 120° C. for 1 hour under a nitrogen atmosphere and mixed thoroughly. A mixture of 100 g of N-vinylformamide, 1 g of divinylethyleneurea and 20 ml of n-propanol was added continuously to the constantly stirred mixture in the course of 90 minutes. Polymerization began without any detectable induction period. The heat-transfer medium n-propanol was distilled off continuously from the polymerization zone. An insoluble polymer which was only slightly swellable was obtained in the form of white particles. When the addition was complete, polymerization was continued for a further 30 minutes at 120° C., the mixture was cooled, the product was washed thoroughly with water and methanol and dried at 70° C. under reduced pressure. The yield was 102 g, and the particle diameter of the polymer was from 0.2 to 5 mm.

EXAMPLE 2

5 g of N-vinylpyrrolidone and 0.04 g of divinylethyleneurea were initially taken in the apparatus described above and heated to 130° C. in a stream of nitrogen (in the absence of oxygen), while stirring. After about 20 minutes, a white popcorn polymer formed rapidly. The polymerization in the powder bed was carried out by a method in which 95 g of N-vinyl-N-methylacetamide, 5 g of acrylamide, 1 g of divinylethyleneurea and 5 ml of water were introduced dropwise, at 130° C. and in the course of 90 minutes, onto the dry popcorn polymer powder prepared in this manner, the reaction mass being circulated. Polymerization begain without any detectable induction period. During the polymerization, the water used as the heat-transfer medium was distilled off continuously from the flask. When the addition of the monomers was complete, polymerization was continued for a further 30 minutes at 130° C. The popcorn polymer obtained in this manner was washed with acetone and water and then dried at 70° C. under reduced pressure. 99 g of a polymer powder having a mean particle diameter of 2 mm were obtained.

EXAMPLE 3

5 g of a popcorn polymer which had been prepared as described in Example 1 but had not come into contact with oxygen and furthermore had not been washed or dried were initially taken in the apparatus described above. The polymer was stirred for 1 hour at 20° C. in a stream of nitrogen and then heated to 120° C. while stirring further. As soon as the temperature of 120° C. had been reached, a mixture of 80 g of acrylic acid, 20 g of acrylamide, 1.5 g of divinylethyleneurea and 20 ml of water was added in the course of 70 minutes, and the water was distilled off from the flask while circulating the reaction mass. Polymerization began without any detectable induction period. The white product obtained consisted of very hard particles having a mean diameter of about 3 mm. Polymerization was continued for a further 30 minutes, after which the mixture was cooled and the popcorn polymer was washed several times with water and then dried at 70° C. under reduced pressure. The yield was 95 g.

EXAMPLE 4

5 g of the insoluble polymer which was only slightly swellable, had been prepared as described in Example 2 and had been neither washed nor dried were initially taken in the apparatus described above. The polymer was stirred and heated at 120° C. for 1 hour under a nitrogen atmosphere. The polymerization in the powder bed was carried out by a method in which a mixture of 75 g of acrylic acid, 25 g of acrylamide, 1.5 g of divinylethyleneurea and 25 ml of water was introduced dropwise onto this polymer in the course of 75 minutes, while stirring, and the water used as-the heat-transfer medium was distilled off from the flask. Polymerization began without any detectable induction period. When the addition of the monomers was complete, the mixture in powder form was polymerized for a further 30 minutes at 120° C., after which it was cooled, washed 3 times with water and then dried at 70° C. under reduced pressure. 97 g of an insoluble polymer powder which was only slightly swellable were obtained.

EXAMPLE 5

5 g of an insoluble polymer which was only slightly swellable, had been prepared as described in Example 1 but had been neither washed nor dried were initially taken in the apparatus described above. In order to remove traces of oxygen, the polymer was stirred at 130° C. for 1 hour in a stream of nitrogen. To carry out the polymerization in the powder bed, a mixture of 100 g of acrylamide, 1.5 g of methylene-N,N'-bisacrylamide and 90 ml of water was then added in the course of 80 minutes, care being taken to ensure thorough mixing, and the water being distilled from the flask. The mixture was polymerized for a further 30 minutes, after which the product was washed with water and acetone and then dried at 70° C. under reduced pressure. 92 g of a popcorn polymer powder were obtained.

EXAMPLE 6

5 g of the popcorn polymer described in Example 1 were initially taken in the apparatus described above and heated to 120° C., while stirring. A feed consisting of 5 g of a acrylamide, 0.05 g of divinylethyleneurea and 5 ml of water was then introduced dropwise in the course of 5 minutes; polymerization began immediately, and the water was distilled off from the flask. Thereafter, the composition of the feed was changed suddenly by adding a mixture of 100 g of acrylic acid, 1 g of divinylethyleneurea and 10 ml of water dropwise in the course of 2 hours, but circulating the mixture and distilling off the water used as the heat-transfer medium from the flask. Polymerization was subsequently continued for a further hour at 120° C. The resulting popcorn polymer was washed with acetone and water and then dried at 70° C. under reduced pressure. 82 g of a popcorn polymer powder having a mean particle diameter of about 3 mm were obtained.

EXAMPLE 7

Example 6 was repeated, except that a mixture of 100 g of methacrylic acid, 3 g of divinylethyleneurea and 20 ml of water was added in the course of 90 minutes, as the second feed. 106 g of a white popcorn polymer having a particle diameter of about 2 mm were obtained.

EXAMPLES 8 TO 17

15 g of N-vinylpyrrolidone and 0.12 g of divinylethyleneurea were first polymerized in the absence of oxygen and in a stream of nitrogen by heating this mixture to 110° C., while stirring constantly. At this temperature, a white, loose polymer starts to form after about 15 minutes. Polymerization was then complete in the course of 5 minutes. This polymer served as the initially taken material for the polymerization in the powder bed, which was then carried out in the course of from 90 to 120 minutes with circulation of the reaction mass and removal of the solvent from the reaction mixture by distillation. The monomers and heat-transfer media used in each case in the polymerization in the powder bed are shown in Table 1. When the monomers had been added, the reaction mixture was polymerized for a further hour while maintaining the particular temperature at which the polymerization was effected. Thereafter, the popcorn polymers were washed twice with acetone and dried at 70° C. under reduced pressure. The polymerization temperatures and the yields are likewise shown in Table 1.

TABLE

| Example No. | Feed | Polymerization temperature [°C.] | Yield [g] |
|---|---|---|---|
| 8 | 100 g of methyl acrylate and 2 g of butanediol diacrylate dissolved in 25 ml of ethyl acetate | 110 | 101 |
| 9 | 100 g of ethyl acrylate and 4 g of divinylethyleneurea dissolved in 50 ml of n-propanol | 110 | 105 |
| 10 | 100 g of butyl acrylate and 1 g of ethylidene-bis-3-(vinylpyrrolidone) dissolved in 25 ml of n-propanol | 110 | 106 |
| 11 | 100 g of 2-hydroxyethyl acrylate and 1.2 g of divinylethyleneurea dissolved in 40 ml of n-propanol | 130 | 100 |
| 12 | 100 g of hydroxypropyl acrylate (isomer mixture of 2- and 3-hydroxypropyl acrylate) and 2 g of butanediol diacrylate dissolved in 40 ml of propyl acetate | 130 | 78 |
| 13 | 100 g of methyl methacrylate and 2 g of butanediol diacrylate dissolved in 25 ml of propyl acetate | 140 | 72 |
| 14 | 100 g of methyl acrylate and 2 g of butanediol diacrylate dissolved in 30 ml of n-heptane | 140 | 74 |
| 15 | 100 g of methyl methacrylate and 1.5 g of divinylethyleneurea dissolved in 25 ml of methylcyclohexane | 140 | 83 |
| 16 | 100 g of methyl methacrylate and 1.5 g of divinylethyleneurea dissolved in 25 ml of toluene | 140 | 98 |
| 17 | 30 g of methyl methacrylate, 70 g of hydroxypropyl acrylate, 1.5 g of butanediol diacrylate dissolved in 30 ml of 4-methylpentan-2-one | 140 | 97 |

Examples of application

For some of the polymers described above, the tannin adsorption was tested. The test was carried out as follows: 100 ml of a 0.1% strength by weight aqueous tannin solution were added to 100 mg of the polymer, and the mixture was shaken for 10 minutes and for 40 minutes. After the stated times, the polymer was filtered off in each case, the filtrate was diluted with water to 1/5 of the initial concentration, and the residual tannin content was determined at a wavelength of 275 nm in a spectrophotometer, by comparison with the measurement for an untreated solution. The results shown in Table 2 were obtained

TABLE 2

| Popcorn polymer obtained according to Example | Residual tannin content after | |
|---|---|---|
|  | 10 minutes | 40 minutes |
| 5 | 36% | 14% |
| 11 | 48% | 17% |

For the carboxyl-containing polymers obtained in Examples 6 and 7, the ion exchange capacity was determined. To do this, 0.6 g of each of the polymers was shaken with 100 ml of 0.1N sodium hydroxide solution for 12 hours in a flask. Thereafter, 50 ml were removed with a pipette and titrated against 0.1N hydrochloric acid. After extrapolation to the total amount of sodium hydroxide solution used, the following carboxyl contents were determined for the individual polymers:

TABLE 3

| Polymer obtained according to Example | Carboxyl contents [meq/g] |
| --- | --- |
| 6 | 10.9 |
| 7 | 9.8 |

We claim:

1. A process for the preparation of an insoluble polymer powder which is only slightly swellable and which contains monoethylenically unsaturated carboxamides, carboxylic acids and carboxylates, comprising:

copolymerizing N-vinylpyrrolidone or a mixture of
(a) a compound of the formula: $R-CO-NR^1-CH=CH_2$ in which R is H or $C_1-C_3$-alkyl and $R^1$ is H or $CH_3$, acrylamide, methacrylamide, acrylic acid, methacrylic acid, acrylates, methacrylates and/or a vinyl ester, and (b) from 0.1 to 10% by weight, based on the total amount of monomers, of, as a crosslinking agent, a compound which possesses at least two ethylenically unsaturated double bonds in the absence of both oxygen and a polymerization initiator in a powder bed which contains or consists of an insoluble polymer which is only slightly swellable, in the presence of a heat-transfer medium which is inert to the reactants, at from 90° to 220° C., the powdered state of the bed being maintained, and the reaction mass being circulated and the heat-transfer medium being evaporated from the polymerization zone.

2. The process as claimed in claim 1, wherein the monomers (a) and (b) are introduced continuously or batchwise into the powder bed.

3. The process as claimed in claim 1, wherein polymer powder is discharged continuously or batchwise from the polymerization zone in an amount corresponding to the weight of monomers fed in.

4. The process as claimed in claim 1, wherein, in order to initiater the polymerization, said powdered bed is an insoluble polymer which is only slightly swellable and has been prepared in a conventional manner and handled in the absence of oxygen.

5. The process as claimed in claim 1, wherein said component (a) is N-vinylformamide, N-vinyl-N-methylacetamide, acrylamide, methacrylamide, acrylic acid or methacrylic acid.

6. The process as claimed in claim 1, wherein said component (a) is a mixture of acrylamide and acrylic acid.

7. The process as claimed in claim 1, wherein said component (a) is a mixture of methacrylic acid and acrylic acid.

8. The process as claimed in claim 1, wherein said component (a) is a mixture of acrylamide and methacrylamide.

9. The process as claimed in claim 1, wherein said crosslinking agent is present in an amount ranging from 0.4 to 2% by weight.

10. The process as claimed in claim 1, wherein said crosslinking spent is divinylethyleneurea, ethylidene-bis-3-(N-vinylpyrrolidone), 1-vinyl-3-ethylidenepyrrolidone, allyl acrylate, allkylmethacrylate, divinylpropyleneurea, butanediol diacrylate, methylene-N,N'-bisacrylamide, ethylene-N,N'-bisacrylamide, a mixture of divinylethyleneurea and butanediol diacrylate or a mixture of divinylpropyleneurea and methylene-N,N'-bisacrylamide.

11. The process as claimed in claim 1, wherein said heat-transfer medium is water, an alcohol, ketone, ether, aromatic or aliphatic hydrocarbon, halohydrocarbon or ester.

12. The process as claimed in claim 1, wherein said vinylamide monomer of the indicated formula is N-vinylformamide, N-vinyl-N-methylformamide or N-vinyl-N-methylacetamide.

13. The process as claimed in claim 1, wherein said monomer mixture is:
(a) N-vinylformamide and acrylic acid,
(b) N-vinylformamide and methacrylic acid,
(c) N-vinylformamide and acrylamide,
(d) N-vinylformaide and methacrylamide,
(e) N-vinylformamide and an acrylate or methacrylate of a $C_1-C_4$-alcohol,
(f) acrylamide and acrylic acid,
(g) acrylamide and methacrylic acid,
(h) methacrylic acid and acrylic acid or
(i) acrylamide and methacrylamide.

14. The process as claimed in claim 1, wherein said powdered bed material is glass beads, powdered titanium dioxide or powdered polymer.

* * * * *